M. Hamburger,
Chair Bottom,

No. 70,556. Patented Nov. 5, 1867.

Witnesses:
Theo Tusche
Wm. Trewin

Inventor:
M. Hamburger
Per Munn & Co
Attorneys

United States Patent Office.

MATHIAS HAMBURGER, OF NEW YORK, N. Y.

Letters Patent No. 70,556, dated November 5, 1867.

---

IMPROVED REVERSIBLE CHAIR-SEAT.

---

The Schedule referred to in these Letters Patent and making part of the same.

---

TO ALL WHOM IT MAY CONCERN:

Be it known that I, MATHIAS HAMBURGER, of the city, county, and State of New York, have invented a new and improved Reversible Chair-Seat; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

The object of this invention is to so arrange the seats of barbers' and other chairs that the same can be reversed so that every new occupant may be provided with a fresh and cool seat.

The invention consists in pivoting a seat which is cushioned on both sides between the frame of the chair, and in arranging a tubular lug at one end of the seat, by means of which it can be fastened in any desired position, the lug either resting upon a stop when in front, or receiving a supporting-pin when in rear.

Figure 1:
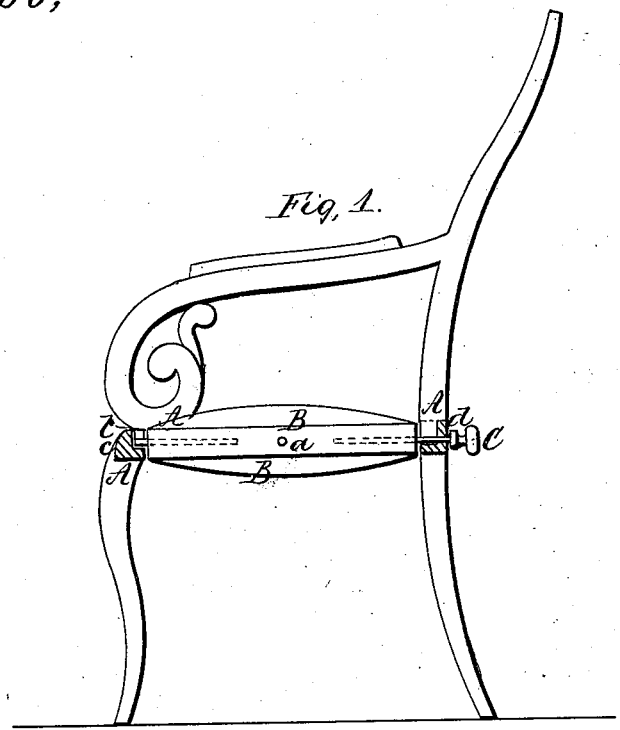
Figure 1 represents a side elevation, partly in section, of my invention.
Figure 2:
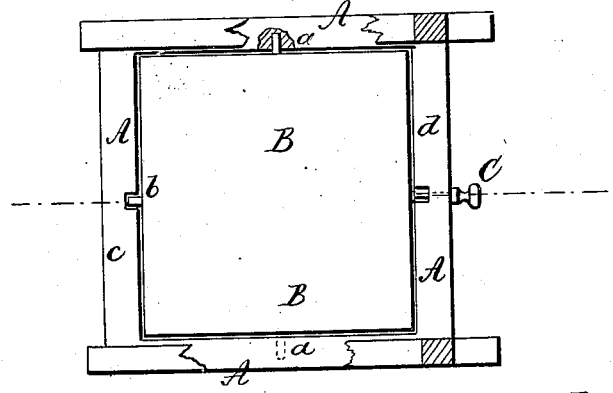
Figure 2 is a plan or top view, partly in section, of the same.

A represents a chair-frame of ordinary or suitable construction. B is the seat, cushioned in any suitable manner on both sides. It is fitted in its own frame, from the sides of which two pivot-pins $a\ a$ project. By means of these pins the seat is pivoted to the sides of the frame A, and could revolve therein if a stop, $b$, had not been secured to one end of the frame of the seat B. This stop $b$ fits into a recess provided on the surface of the front bar $c$ of the frame A, if the seat is in the position shown in fig. 1, while it fits in a recess provided in the surface of the rear bar $d$ of the frame A, if it is reversed. C is a pin, fitted, through the rear bar $d$ of the frame A, into the seat B, as shown in fig. 1, to secure the same in its position. When the seat is reversed, the pin C is fitted through the tubular stop $b$. The pin C may also be arranged in the sides of the frame, so as to be near one end; but having it in rear is preferable. Two or more stops $b$ may be used in place of the one shown. This same invention may be also applicable to the back and head-rests of chairs, the parts being of similar construction as those herein described.

I claim as new, and desire to secure by Letters Patent—

The reversible seat B, when hinged, by means of pins $a\ a$, in the chair-frame A, and when combined with the stop $b$ and pin C, all made and operating substantially as herein shown and described.

MATHIAS HAMBURGER.

Witnesses:
WM. F. MCNAMARA,
ALEX. F. ROBERTS.